United States Patent
van Gassel et al.

(10) Patent No.: US 9,912,568 B2
(45) Date of Patent: Mar. 6, 2018

(54) METHOD AND APPARATUS FOR HANDLING BROKEN PATH IN PEER-TO-PEER NETWORK

(75) Inventors: Jozef Pieter van Gassel, Tampere (FI); Imed Bouazizi, Tampere (FI); Igor Danilo Diego Curcio, Tampere (FI); Jani Antero Peltotalo, Tampere (FI); Marko Antti Juhani Saukko, Turku (FI); Lassi Ilari Väätämöinen, Tampere (FI)

(73) Assignee: Provenance Asset Group LLC, Essex, CT (US)

( * ) Notice: Subject to any disclaimer, the term of this patent is extended or adjusted under 35 U.S.C. 154(b) by 1210 days.

(21) Appl. No.: 12/491,186

(22) Filed: Jun. 24, 2009

(65) Prior Publication Data

US 2010/0329126 A1    Dec. 30, 2010

(51) Int. Cl.
| | |
|---|---|
| H04L 12/26 | (2006.01) |
| H04L 12/707 | (2013.01) |
| H04L 12/701 | (2013.01) |
| H04J 3/14 | (2006.01) |
| H04L 29/08 | (2006.01) |

(52) U.S. Cl.
CPC .......... *H04L 43/16* (2013.01); *H04L 43/0829* (2013.01); *H04L 67/104* (2013.01)

(58) Field of Classification Search
CPC . H04J 3/14; H04L 43/50; H04L 48/25; H04L 45/22; H04L 45/00
USPC ................. 370/217–219, 221, 242
See application file for complete search history.

(56) References Cited

U.S. PATENT DOCUMENTS

| | | | |
|---|---|---|---|
| 7,254,602 B1* | 8/2007 | Boivie ................ | 709/201 |
| 7,385,978 B1* | 6/2008 | Yang et al. ........... | 370/390 |
| 2002/0004842 A1* | 1/2002 | Ghose et al. ......... | 709/235 |
| 2002/0143855 A1* | 10/2002 | Traversat et al. ..... | 709/202 |
| 2003/0037165 A1* | 2/2003 | Shinomiya ........... | 709/238 |
| 2004/0095964 A1* | 5/2004 | Meylan et al. ........ | 370/506 |
| 2004/0199662 A1* | 10/2004 | Karol et al. .......... | 709/238 |
| 2005/0105494 A1* | 5/2005 | Kim .............. | H04L 1/0003 370/335 |
| 2005/0198320 A1* | 9/2005 | Chou et al. .......... | 709/228 |

(Continued)

FOREIGN PATENT DOCUMENTS

| | | |
|---|---|---|
| WO | WO 2009/036461 | 3/2009 |
| WO | WO 2009/036461 A2 | 3/2009 |
| WO | WO 2010/020843 A1 | 2/2010 |

OTHER PUBLICATIONS

Office Action for Chinese Application No. 201080027147.X dated Jun. 18, 2014.

(Continued)

*Primary Examiner* — Ronald B Abelson
(74) *Attorney, Agent, or Firm* — Dinsmore & Shohl LLP

(57) ABSTRACT

A method comprises (a) detecting a packet loss in a partial data packet stream in a peer-to-peer network; (b) signaling an indication of lost packets to one or more sending peers serving the partial data packet stream corresponding to the packet loss; (c) after expiration of a threshold period of time without receiving lost packets, signaling one or more candidate peers a request for retransmission of the lost packets, the candidate peers being peers not serving the partial data packet stream; and (d) receiving the lost packets through one of the candidate peers.

14 Claims, 11 Drawing Sheets

(56) References Cited

U.S. PATENT DOCUMENTS

| | | | |
|---|---|---|---|
| 2006/0056421 A1* | 3/2006 | Zaki | H04L 1/1664 370/400 |
| 2006/0171338 A1* | 8/2006 | Lim | 370/278 |
| 2006/0187897 A1 | 8/2006 | Dabbs, III et al. | |
| 2006/0206783 A1 | 9/2006 | Nishihara et al. | |
| 2007/0002763 A1* | 1/2007 | Hulyalkar et al. | 370/252 |
| 2007/0050716 A1* | 3/2007 | Leahy et al. | 715/706 |
| 2007/0064702 A1* | 3/2007 | Bates et al. | 370/392 |
| 2007/0206673 A1* | 9/2007 | Cipolli et al. | 375/240.1 |
| 2008/0016453 A1* | 1/2008 | Quillen et al. | 715/763 |
| 2008/0219151 A1* | 9/2008 | Ma | H04H 60/11 370/221 |
| 2009/0024754 A1 | 1/2009 | Setton et al. | |
| 2009/0141621 A1* | 6/2009 | Fan et al. | 370/223 |
| 2009/0201928 A1* | 8/2009 | Chen et al. | 370/390 |
| 2010/0030861 A1* | 2/2010 | Oertel | 709/206 |
| 2010/0220586 A1* | 9/2010 | Rogan et al. | 370/218 |
| 2010/0284341 A1* | 11/2010 | Abrol et al. | 370/328 |
| 2010/0318652 A1* | 12/2010 | Samba | 709/224 |

OTHER PUBLICATIONS

Office Action for Chinese Application No. 201080027147X dated Sep. 8, 2015.

Zhang, Q., et al. "Design and Performance Evaluation of Cooperative Retransmission Scheme for Reliable Multicast Services in Cellular Controlled P2P Networks." IEEE Int'l Symposium on Personal, Indoor and Mobile Radio Communications. PIMRC. Sep. 1, 2007.

International Search Report for PCT Application No. PCT/US2010/001175 dated Sep. 30, 2010.

International Search Report for Application No. PCT/US2010/001175 dated Sep. 30, 2010.

International Preliminary Report on Patentability/Written Opinion for Application No. PCT/IB2010/001175 dated Jan. 4, 2012.

Office Action for Chinese Application No. 201080027147.X dated Feb. 15, 2015.

Supplementary European Search Report for Application No. EP 10 79 1691 dated Jan. 29, 2014.

Fielding, R. et al., *Hypertext Transfer Protocol—HTTP/1.1*, RFC 2068 (Jan. 1997) 152 pages.

Friedman, T. et al., *RTP Control Protocol Extended Reports (RTCP XR)*, RFC 3611 (Nov. 2003) 52 pages.

Ott, J. et al., *Extended RTP Profile for Real-Time Transport Control Protocol (RTCP)-Based Feedback (RTP/AVPF)*, RFC 4585 (Jul. 2006) 48 pages.

Peltotalo, J. et al., *A Real-Time Peer-to-Peer Streaming System for the Mobile Environment*, Proceeding INFOCOM'09 Proceedings of the 28$^{th}$ IEEE International Conference on Computer Communications Workshops (2009) 7 pages.

Rey, J. et al., *RTP Retransmission Payload Format*, RFC 4588 (Jul. 2006) 33 pages.

Schulzrinne, H. et al., *Real Time Streaming Protocol (RTSP)*, RFC 2326 (Apr. 1998) 86 pages.

Schulzrinne, H. et al., *Real Time Streaming Protocol 2.0 (RTSP) draft-ietf-mmusic-rfc2326bis-40*, RFC 2326 (if approved) Feb. 10, 2014) 289 pages.

Schulzrinne, H. et al., *RTP: A Transport Protocol for Real-Time Applications*, RFC 3550 (Jul. 2003) 98 pages.

Zhang, Q. et al., *Design and Performance Evaluation of Cooperative Retransmission Scheme for Reliable Multicast Services in Cellular Controlled P2P networks*, The 18$^{th}$ Annual IEEE International Symposium on Personal, Indoor and Mobile Radio Communications, PIMRC'07 (Sep. 2007) XP031168851, 5 pages.

3$^{rd}$ Generation Partnership Project: Technical Specification Group Services and System Aspects; Transparent end-to-end Packet-switched Streaming Service (PSS); Protocols and codecs (Release 8) (Sep. 2008) 150 pages.

\* cited by examiner

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |V=2|P|  FMT   |       PT      |           length              |
   +-+-+-+-+-+-+-+-+-+-+-+-+-+-+-+-+-+-+-+-+-+-+-+-+-+-+-+-+-+-+-+-+
   |              SSRC (peer ID) of FB packet sender               |
   +-+-+-+-+-+-+-+-+-+-+-+-+-+-+-+-+-+-+-+-+-+-+-+-+-+-+-+-+-+-+-+-+
   |              SSRC (peer ID) of media source                   |
   +-+-+-+-+-+-+-+-+-+-+-+-+-+-+-+-+-+-+-+-+-+-+-+-+-+-+-+-+-+-+-+-+
   :                         report blocks                        :
   +-+-+-+-+-+-+-+-+-+-+-+-+-+-+-+-+-+-+-+-+-+-+-+-+-+-+-+-+-+-+-+-+
```

FIG. 9

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        PID            |       IFI         |     NPLR/BLP      |
+-+-+-+-+-+-+-+-+-+-+-+-+-+-+-+-+-+-+-+-+-+-+-+-+-+-+-+-+-+-+-+-+
```

FIG. 11

METHOD AND APPARATUS FOR HANDLING BROKEN PATH IN PEER-TO-PEER NETWORK

FIELD OF INVENTION

The present invention relates generally to the field of mobile communication and, more specifically, to mobile peer-to-peer streaming.

BACKGROUND OF THE INVENTION

This section is intended to provide a background or context to the invention that is recited in the claims. The description herein may include concepts that may be pursued, but are not necessarily ones that have been previously conceived or pursued. Therefore, unless otherwise indicated herein, what is described in this section is not prior art to the description and claims in this application and is not admitted to be prior art by inclusion in this section.

Peer-to-peer (P2P) is emerging as a potentially disruptive technology for content distribution to mobile devices over the Internet. It provides an alternative solution to the traditional client-server based approach by reducing the need for centralized servers. Next to the already well-known P2P file sharing, more recently real-time P2P streaming is gaining popularity. Real-time P2P streaming has a number of advantages that enable new applications and business models for the end-user, as well as other players in the value chain. P2P streaming technology, for instance, allows an end-user of a mobile device to broadcast its own content throughout the Internet. This task may be accomplished in real-time without the need for special infrastructure since the user's device, together with all other peers in the network, collectively form the infrastructure. Furthermore, unlike existing content distribution technologies that still require dedicated servers, servers may no longer be required in P2P streaming networks since every peer can serve data to other peers.

These distributed characteristics make real-time P2P streaming an inherently scalable technology, allowing the distribution of an unprecedented number of content from content providers that include the end-users. Furthermore real-time P2P streaming has the potential of becoming a disruptive technology in the broadcasting world since every peer in the network can become an independent broadcaster. This is especially true in light of the recent proliferation of user generated content.

Live streaming and Video-on-Demand (VoD) streaming of content are two example applications where P2P streaming may be effectively utilized. With live streaming, a user typically receives an ongoing event, such as a sporting event, from the peers in the P2P network. The user may therefore start watching the live stream after an initial buffering delay. Furthermore, all peers in a live streaming scenario consume the content in the same time frame. With VoD streaming, a user may request a desired video from a catalogue, and after a delay associated with initial buffering of the content, the user may start watching the requested video from the beginning. From a device manufacturing and usage point of view, Live and VoD P2P streaming applications have a number of important benefits. For instance, users can view the selected programs only after a short delay associated with buffering of the content, as opposed to waiting for the entire file to be downloaded. This feature also reduces device memory requirements, and allows memory resources to be allocated to other applications, a feature that is especially beneficial to mobile devices, with relatively small internal memory.

The user experience and the performance of a real-time P2P streaming service is highly dependent on content availability at the source peer. The peers in a P2P streaming environment, however, are not currently capable of efficiently assessing the availability of a desired content at other peers in the P2P streaming network.

SUMMARY OF THE INVENTION

In one aspect of the invention, a method comprises (a) detecting a packet loss in a partial data packet stream in a peer-to-peer network; (b) signaling an indication of lost packets to one or more sending peers serving the partial data packet stream corresponding to the packet loss; (c) after satisfaction of a threshold parameter without receiving lost packets, signaling one or more candidate peers a request for retransmission of the lost packets, the candidate peers being peers not serving the partial data packet stream; and (d) receiving the lost packets through one of the candidate peers.

In one embodiment, the satisfaction of a threshold parameter is expiration of a threshold time period.

In one embodiment, the method further comprises signaling one or more downstream peers an indication that the packet loss has been signaled to a source peer.

In one embodiment, the method further comprises, upon receipt of retransmitted lost packets, signaling an indication of the receipt of the lost packets to one or more peers which were upstream before detection of the packet loss.

In one embodiment, the partial data packet stream is received through real-time transport protocol (RTP). The signaling in (b) may use RTP control protocol (RTCP). The signaling in (c) may use real time streaming protocol (RTSP). The signaling in (c) using real time streaming protocol (RTSP) may include setting up an RTP session with a candidate peer.

In another aspect of the invention, an apparatus comprises a processor and a memory unit communicatively connected to the processor. The memory unit includes (a) computer code for detecting a packet loss in a partial data packet stream in a peer-to-peer network; (b) computer code for signaling an indication of lost packets to one or more sending peers serving the partial data packet stream corresponding to the packet loss; (c) computer code for, after expiration of a threshold period of time without receiving lost packets, signaling one or more candidate peers a request for retransmission of the lost packets, the candidate peers being peers not serving the partial data packet stream; and (d) computer code for receiving the lost packets through one of the candidate peers.

In another aspect of the invention, a computer program product is embodied on a computer-readable medium and comprises (a) computer code for detecting a packet loss in a partial data packet stream in a peer-to-peer network; (b) computer code for signaling an indication of lost packets to one or more sending peers serving the partial data packet stream corresponding to the packet loss; (c) computer code for, after expiration of a threshold period of time without receiving lost packets, signaling one or more candidate peers a request for retransmission of the lost packets, the candidate peers being peers not serving the partial data packet stream; and (d) computer code for receiving the lost packets through one of the candidate peers.

These and other advantages and features of various embodiments of the present invention, together with the organization and manner of operation thereof, will become apparent from the following detailed description when taken in conjunction with the accompanying drawings.

BRIEF DESCRIPTION OF THE DRAWINGS

Embodiments of the invention are described by referring to the attached drawings, in which:

FIGS. 9, 10, and 11 are embodiments schematic representations of a common packet format portion.

DETAILED DESCRIPTION OF THE VARIOUS EMBODIMENTS

Figure 1:
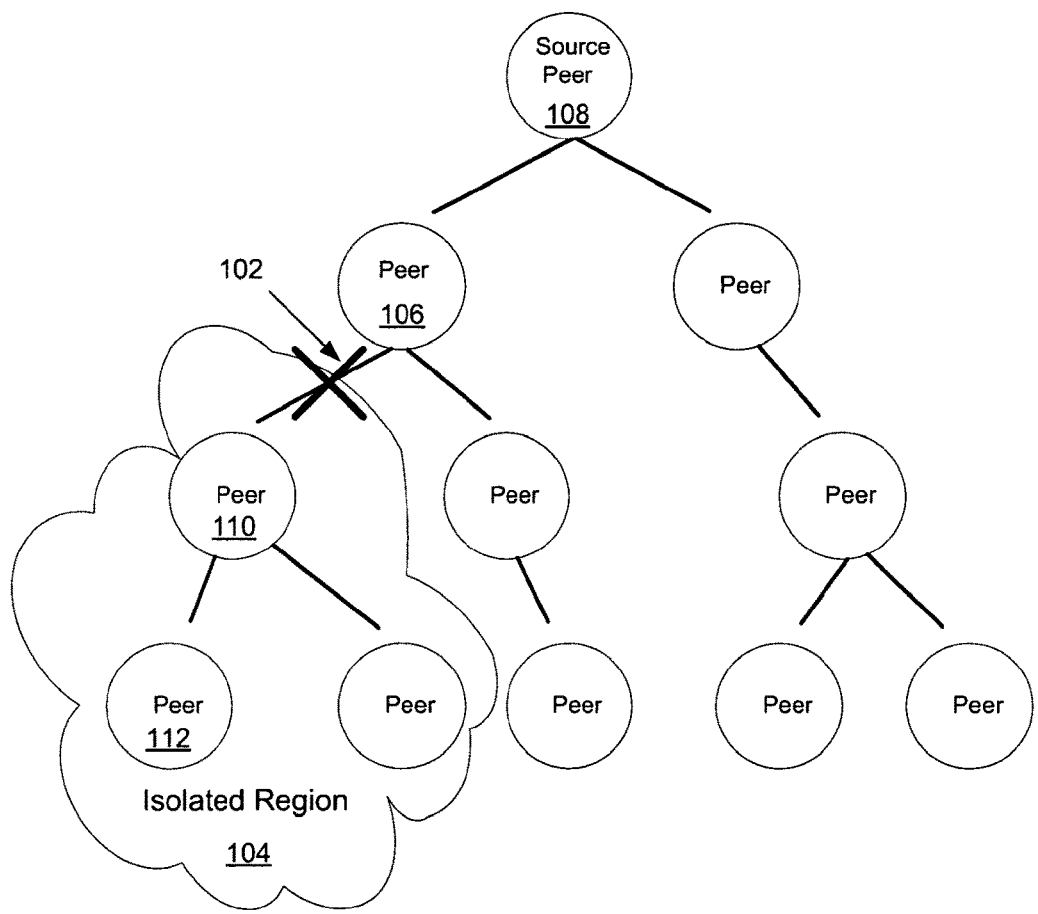
FIG. 1 is a schematic illustration of an exemplary P2P arrangement.

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

In conventional Real-Time Protocol (RTP)/RTP Control Protocol (RTCP)-based streaming applications, one or more receivers are connected to a single sender. Although in the case of multi-party conferencing there may be multiple servers, a receiver of a particular RTP session is only retrieving data from a single sender. In such applications, failures in the network path between sender and receiver can cause packet losses.

Certain mechanisms are available for the retransmission of lost packets. One procedure includes signalling of the losses by the receiver and retransmitting of the lost packets by the sender. One method to signal packet losses to the sender is using a Generic Negative Acknowledgment (NACK) RTCP message.

In such distributed peer-to-peer (P2P) streaming applications, a single media stream may be broken down in smaller sub-streams using, for example, Scalable Video Coding (SVC) or Multi Description Coding (MDC). In one system, a single RTP session (i.e., media stream) is broken down into smaller partial RTP sessions. These methods allow a single media stream, like an audio or video component, to be served simultaneously by multiple senders.

Thus, every peer that is consuming a media stream may also be serving, at the same time, other peers with sub-streams of the media stream. Because peers may join and leave the service at will, streams being sent to a receiver as sub-streams may be temporarily interrupted, introducing another cause of packet losses in peer-to-peer systems.

Thus, in a multi-sender peer-to-peer environment, causes from which packet loss may be experienced may include:

1. Network failure: This is the cause of packet loss in the "traditional" RTP/RTCP-based media streaming where packets may be lost along the path of the wireless networks. Typically a burst of packets are lost after which normal reception of packets is resumed.

2. Peer churn: This cause is unique to the peer-to-peer environment where peers in the overlay network arrive and depart in a dynamic manner (i.e., peer churn). This cause manifests itself by a sudden uncontrolled and unexpected disappearance of a sender (e.g., due to peer failure or peer withdrawal) and, as a result, packets are lost at the receiving peer.

Upon detection of packet loss by a receiving peer, the receiving peer may be unaware as to which of the above conditions resulted in the experienced packet loss.

Therefore, the traditional RTCP-based signalling solution, as described above, is insufficient for signalling lost packets in the peer-to-peer case. When a sender completely leaves the network, it is pointless to keep sending Generic NACK RTCP messages to signal lost packets since they will never be received by the departed sender. The receiver does not know to what sender to address the retransmission request since a "valid" sender is no longer within reach. Further, a retransmission method should be scalable.

Referring to FIG. 1, an exemplary P2P arrangement is schematically illustrated. As illustrated in FIG. 1, once a single connection 102 becomes temporarily unavailable (as indicated by the X), all the peers in the isolated region 104 may start signalling packet losses or explicitly start to request retransmissions. This may occur when a peer (e.g., peer 106) along the path back to the source peer 108 (e.g., the original source) departs the overlay network. In this case, peers directly receiving from the departing peer 106 (e.g., peer 110), as well as all other downstream peers (e.g., peer 112), may start requesting retransmission of the same data.

Such propogation and proliferation of retransmission requests throughout the system is undesirable and should be avoided (or, at least, controlled) in order to allow the solution to scale to larger network sizes. Embodiments of the present invention provide scalable mechanisms to request retransmission of lost packets in peer-to-peer based networks, particularly those based on the RTP/RTCP and RTSP protocols. In the regard, embodiments of the present invention relate to how the packet losses are signalled and how the scalability is maintained. The actual retransmission may be implemented using a variety of mechanisms.

Figure 2:
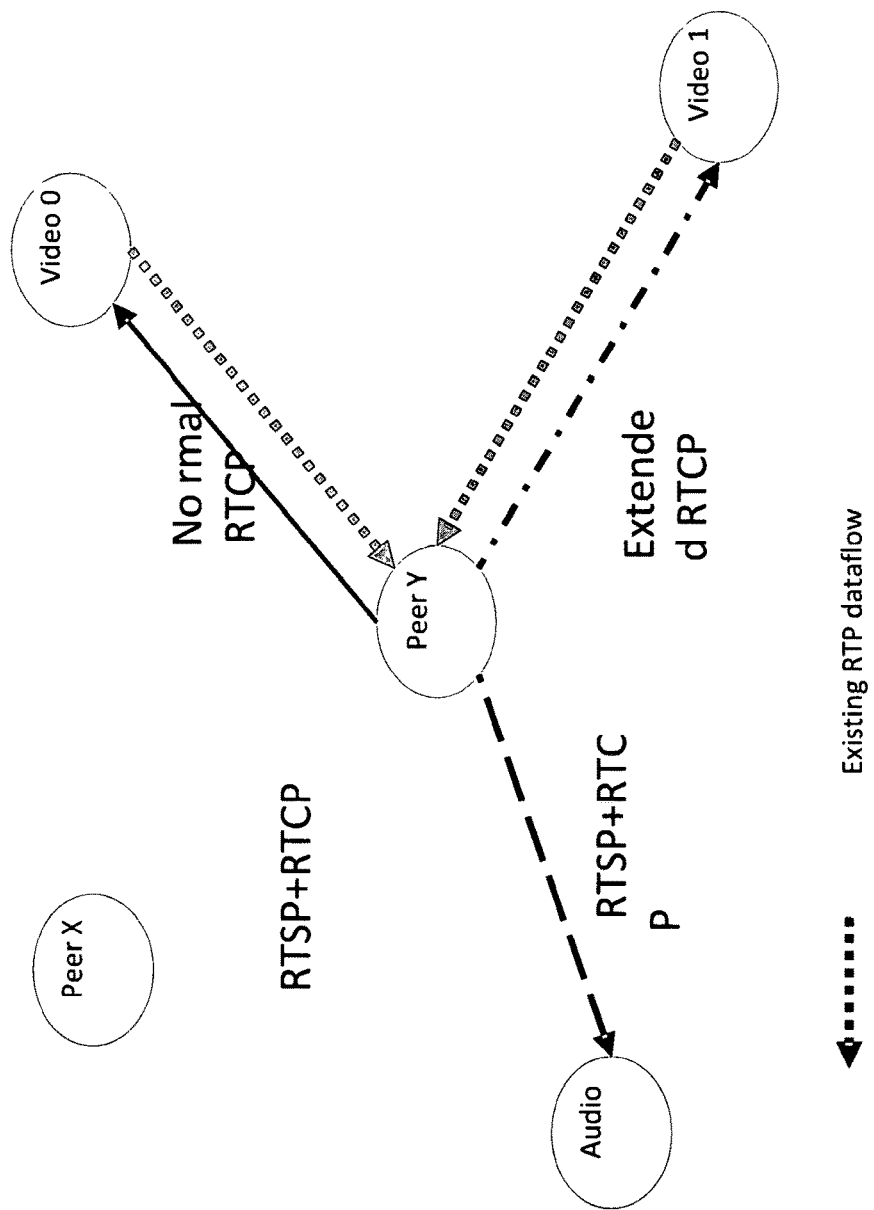
FIG. 2 is a schematic illustration of an exemplary retransmission using RTCP.

RTCP-based Generic NACK messages are used to signal packet losses from the receiver to the sender in a traditional streaming application. Referring now to FIG. 2, various methods of using RTCP in the peer-top-peer context for this purpose are illustrated.

In FIG. 2, Peer Y receives audio, video partial 0 and video partial 1 from the "Audio", "Video 0", and "Video 1" peers, respectively. In this example, Peer Y detects packet loss from the "Video 0" peer. Using RTCP, Peer Y may signal packet losses to other peers using RTCP in the following ways:

(1) Normal RTCP: Generic NACK RTCP Receiver Reports (RRs) may be sent. In this case, the RTCP RRs are used to signal the losses to the sending peer from which it was expecting to retrieve the lost packets. This may be considered as normal operation.

(2) Extended RTCP: RTCP may be used to signal losses to a peer that was not serving the missing packets in the first place. However, the peer receiving the RTCP messages had been serving a different partial from the same RTP session. This extends the scope of the original RTP/RTCP specification beyond its normal use.

(3) RTSP+RTCP: Since RTCP can only be used in the presence of an RTP connection and since no media stream is set up beforehand, RTSP must be used to set up an RTP session between peers. In this case, the sole purpose of providing an RTP stream is the retransmission of lost packets. However, using the RTSP header fields to signal the lost packets for this purpose may be more suitable.

In summary, RTCP is only suitable for requesting retransmission of data where the sending peer is still available (i.e., at least one RTP session is still ongoing). Otherwise, a new stream would have to be set up using RTSP.

Further, RTCP is already in place in most implementations. Thus, this manner of signalling packet losses is compatible with current specifications. The amount of overhead is small since the Generic NACK messages are sent along with the normal RTCP Receiver Reports (e.g., in compound RTCP messages).

Alternatively, the RTSP PLAY method can be used for requesting retransmission of lost packets. In accordance with embodiments of the present invention, a header field extension, for example, for RTSP 1.0 (a new header field) and RTSP 2.0 (extension of the existing Range header field), is provided to make this possible.

Figure 3:
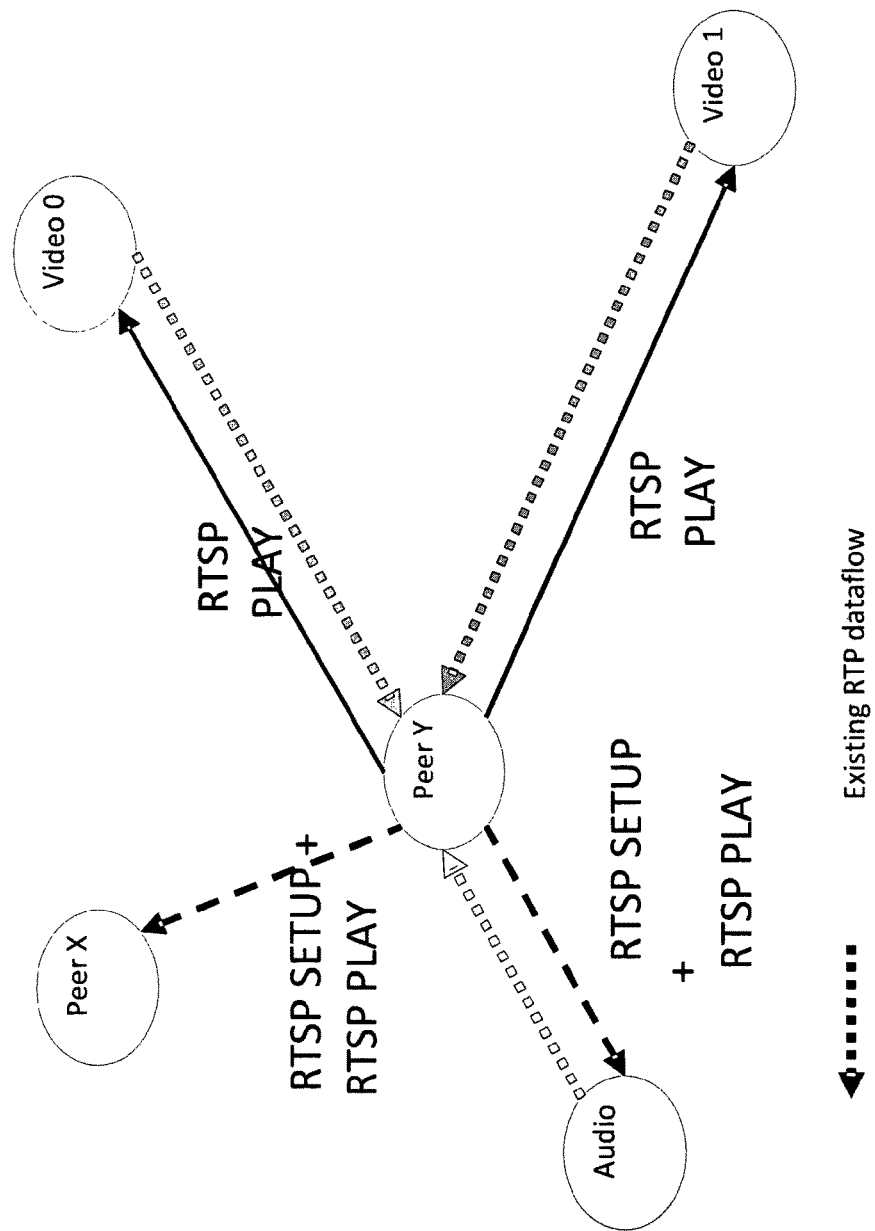
FIG. 3 is a schematic illustration of an exemplary retransmission using RTSP.

Referring now to FIG. 3, a configuration identical to that described above with reference to FIG. 2 is illustrated. In FIG. 3, Peer Y has experienced packet loss from the "Video 0" peer (source) and is requesting retransmission of the lost packets from alternative peers via RTSP in the following ways:

(1) RTSP PLAY: This is the case where a suitable media stream was already set up using RTSP beforehand. The PLAY message can be sent directly to the peer.

(2) RTSP SETUP+RTSP PLAY: This is the case where a new peer is selected which was not serving a suitable media stream that could be used for retransmission. RTSP SETUP is first used to create connection between peers, and PLAY is subsequently used to request the lost packets.

In order to speed up the reconnecting process, RTSP SETUP and PLAY messages may be combined using so-called "pipelining." For additional details on "pipelining," reference may be made to IETF RFC 2326bis, "Real Time Streaming Protocol 2.0" (RTSP) draft-ietf-mmusic-rfc2326bis and to 3rd Generation Partnership Project; Technical Specification Group Services and System Aspects; Transparent end-to-end Packet-switched Streaming Service (PSS); Protocols and codecs (Release 8). In relation to the earlier described RTCP method, the RTSP based method results in a larger impact in terms of message overhead and latencies.

Thus, neither of the above approaches are currently possible, since the current header field syntax does not allow requesting playback (or retransmission) of individual packets or a limited set of packet ranges. The current header field syntax allows time-based ranges, but these do not suffice to uniquely address single packets. However, a simple extension may be used to overcome this limitation. One such extension is described below.

In accordance with embodiments of the present invention, a two-stage procedure may be implemented in order to allow for scalable and efficient retransmission of lost packets in the presence of network failure and/or unexpected peer churn. Embodiments of the present invention aim to use existing mechanisms and add extensions to the current specifications to address cases such as, for example, when a peer has left the network and can, therefore, not retransmit the lost packets.

Scalability is preferred to prevent a ripple-through effect (or avalanche) of retransmission requests in case many peers simultaneously request lost packets due to a single cause (e.g., a failing or departed peer).

In accordance with embodiments of the present invention, a retransmission procedure may include two stages. In a first stage, RTCP may be used in the normal and extended way to signal packet losses to the sending peers. Senders may then retransmit the signaled lost packets to the respective peers. In a second stage, in case a certain time-out value ($T_r$) is exceeded, RTSP may be used to set up new connections and use an extended version of the RTSP PLAY method to retrieve the lost packets. In various embodiments, the time-out value ($T_r$) may be predetermined, but may vary depending upon various parameters. Further, a special signalling of "pending retransmission requests" and "resolved packet losses" can be used to facilitate scalability.

In the following, an example implementation of the two-stage process in accordance with embodiments of the present invention is described.

Stage 1: RTCP Based Retransmission

Upon detection of a packet loss, a receiving peer may use RTCP Receiver Report (RR) messages to signal packet losses to the sender. In this regard, the receiving peer does not explicitly request retransmission; it only signals to the sending peer which packets have been lost. The sending peer may then decide how to respond to this information. The signaling by the receiving peer may be achieved using Generic NACK messages of the RTP extended Audio Video Profile for RTCP Feedback (RTP/AVPF) profile. For additional details on RTP/AVPF, reference may be made to RFC 4585.

The signaling from the receiving peer may be achieved in a number of ways, as illustrated in FIG. 2. The packet losses may be signaled back to the peer from which the missing packets were expected. In FIG. 2, this option is referred to as "normal". This option is similar to the normal operation of Generic NACK messages for signalling packet loss. In one embodiment, a similar RTCP Receiver Report may be sent, either in place of or in addition to the "normal" option, to other peers serving different partial streams from the same RTP session (e.g., the same audio or video media sub stream). In FIG. 2, this is referred to as the "extended" option.

Stage 2: RTSP Based Retransmission

If the packets that have been signaled by the receiving peer as lost are not received within a certain reconnect threshold $T_r$, the receiving peer may select an alternative source peer using an intelligent peer selection algorithm. In one embodiment, the time-out value $T_r$ may, for example, be based on network and buffering latencies, as discussed in more detail below.

The candidate alternative source peers to which the retransmission request is sent may be peers that are already serving the receiving peer with other media streams of the same service. For example, with reference to FIG. 3, the candidate alternative source peer may the "Audio" peer, from which the audio stream of the service may be received. On other embodiments the candidate alternative source peer may be a completely different peer, such as Peer X of FIG. 3. In Stage 2, the candidate peers are other than those peers that are already serving other partials from the same RTP session; such peers should be considered in Stage 1 described above. Retransmissions from the alternative source peers are explicitly requested by setting up a new RTP connection using SETUP and RTSP PLAY methods. In accordance with certain embodiments of the present invention, the header fields of the PLAY method may be extended to allow the request of individually lost packets and lost packet ranges, as described below.

If RTSP is used, the alternative connection may be either set up permanently (e.g., open-ended, resuming normal playback operation afterwards through the alternative connection) or used only to retrieve lost packets. If set up permanently, the old existing connection is discarded and playback resumes with the new source peer. The resumption of playback may occur after individual lost packets have been received. If the alternative connection is used only to retrieve the lost packets, the connection can be torn down using the TEARDOWN method after the lost packets have been received.

In certain embodiments of the present invention, the speed of retransmissions may be improved by keeping open backup RTSP connections for the purpose of requesting retransmission of lost packets in case other peers fail. Thus, in this regard, no actual streaming is taking place through the backup RTSP connections except for the retransmission of lost packets. This allows faster error recovery since the SETUP time, and hence one round-trip time, is eliminated from the retransmission procedure. Note that similar performance improvements may also be realized by pipelining the RTSP SETUP and PLAY methods as described in RTSP 2.0 and 3GPP PSS.

Figure 4:
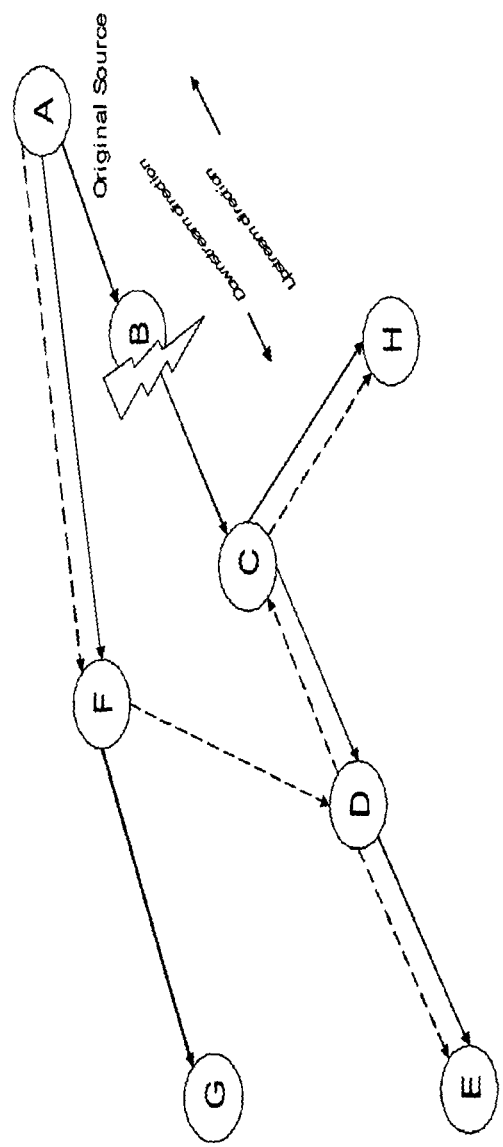
FIG. 4 is a schematic illustration of signaling for recovery of a broken streaming path of a partial RTP session.

Referring now to FIG. 4, embodiments of the present invention provide a signaling mechanism which avoids multiple peers, downstream from the point of failure in a broken path, from signaling lost packets. In the peer-to-peer streaming context, the path is considered to be the sequence of lines in the graph of FIG. 4 from the original source peer (Peer A) at the root of the graph to the last peer at the leaf of the graph (e.g., Peer E).

In accordance with embodiments of the present invention, signaling may include indications of pending requests for retransmission downstream (in the direction of the data flow from original source to leaf) in the graph of FIG. 4. Thus, in the absence of packets (e.g., in the case of lost packets), information may be signaled to indicate to receiving peers that the sender is aware of the losses. Further, embodiments of the present invention may provide signaling of recovered packets in the upstream direction (in the opposite direction of the data flow from leaf of the graph to the original source). This upstream signaling may be used to efficiently reconnect to other peers and to signal that the broken-path problem has been resolved.

An example of the above-noted upstream and downstream signaling is illustrated in FIG. 4. FIG. 4 illustrates the graph in a network representing the delivery flow of a particular partial RTP Session (illustrated by the solid lines in FIG. 4). In the illustration of FIG. 4, peer B malfunctions and causes downstream peers C, D, E and H to experience packet losses. The same packet losses may also be caused by a failing network link between peers B and C. With the packet losses, Peers C, D, E and H may start requesting retransmissions and, as a result, flood the network with redundant retransmissions of the same lost packets. Thus, the efficiency and scalability of the system may be jeopardized.

In accordance with embodiments of the present invention, peers may signal pending retransmission requests downstream and may signal recovery of lost packets upstream. In the example of FIG. 4, once it transmits a retransmission request, Peer C may pass on the pending retransmission request downstream along the path defined by Peers D, E and H, thereby eliminating possible independent retransmission requests from downstream Peers D, E and H. In one embodiment, this is achieved using extensions of the RTCP Receiver Reports, as described in greater detail below. When a receiving peer experiences packet loss, the receiving peer may wait for a length of time, which may be predetermined, random or based on other factors, before it concludes packet loss and signals the request for retransmission.

This downstream signaling reduces the time it takes for a particular peer to detect packet loss since, in absence of packets, signaling is available to indicate the loss of the packets. Thus, a downstream peer may not need to wait for a length of time before concluding that packets have been lost somewhere upstream. This can also help reduce the recovery times, since it is possible to take error recovery measures at an earlier stage.

When a peer discovers pending upstream retransmission requests, it may either (1) wait until the lost packets are received from the sending peer or (2) choose to take its own error-recovery measures. In case (1), once the upstream peer has found an alternative source or the original sending peer has recovered from the problematic situation, the lost packets may be received by the downstream peer. In case (2), a downstream peer may proactively try to find other peer sources, exploiting the knowledge obtained from the signaled pending retransmission request.

Once any peer along the path of the graph has successfully recovered lost packets by reconnecting to a reliable peer, it can signal the recovery both upstream and downstream. This improves the self-recovery capability of the peer-to-peer system.

Thus, in accordance with embodiments of the present invention, the overlay of the peer-to-peer network may be reorganized jointly by the distributed peers in a coordinated effort by establishing a new path in the graph. Referring again to FIG. 4, this is illustrated by peer D discovering an alternative source, peer F, before the sending peer C solves the problem. Upon receiving the signaling of the new source peer from Peer D, peer C may elect to switch roles and use peer D as a new source peer for this particular partial RTP session. Thus, a new streaming graph (indicated by the dashed lines in FIG. 4) is constructed jointly by the involved peers.

In accordance with other embodiments of the present invention, in place of explicit signalling of pending retransmission requests and of recovered packets, sending peers may also choose to selectively ignore the signaled packet losses from receiving peers. This may also prevent massive (redundant) retransmission of lost packets throughout the peer-to-peer system. However, since no explicit signalling takes place between sending and receiving peers, this is expected to be a less efficient and scalable alternative than the signalling described above.

Figure 5:
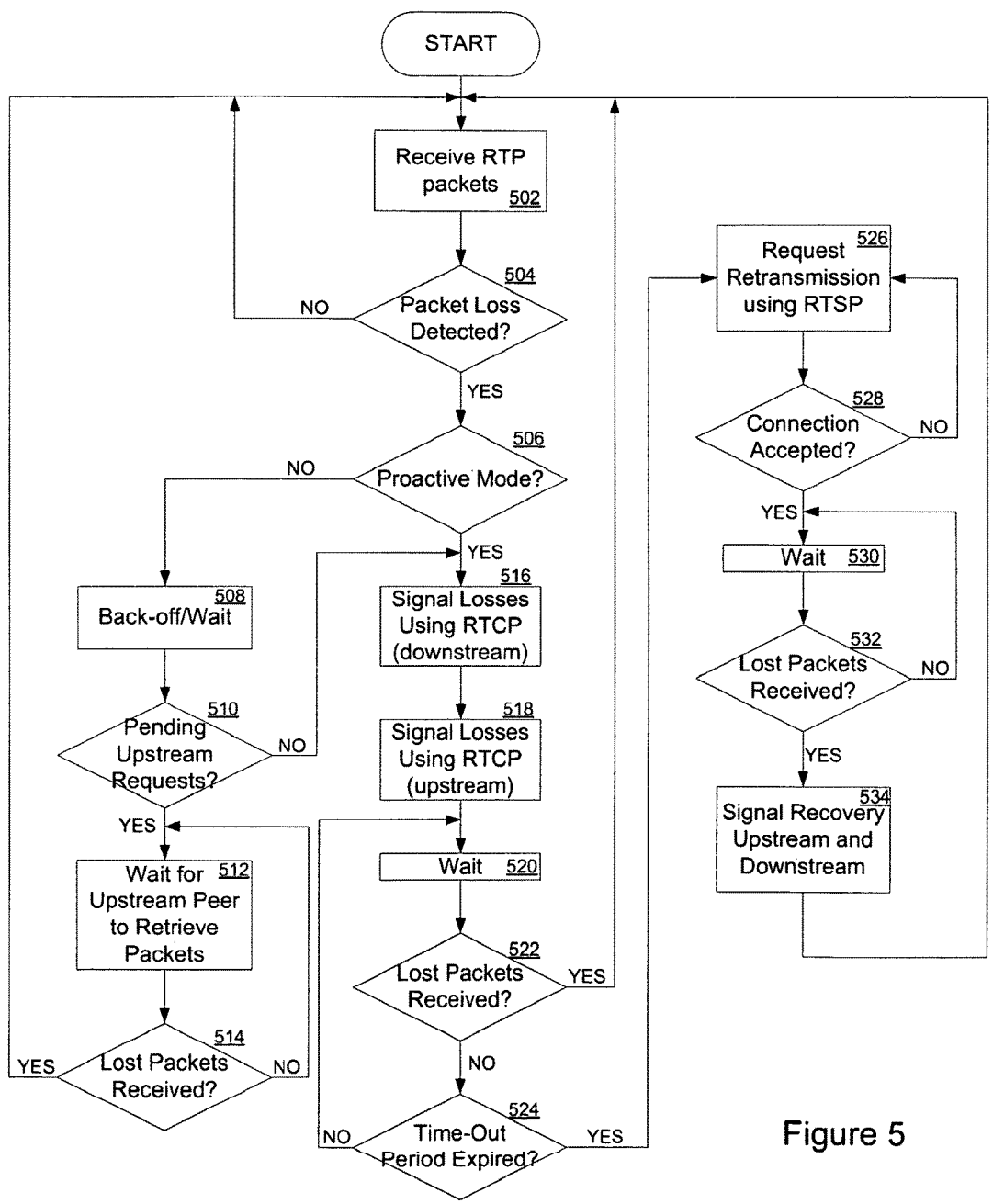
FIG. 5 is a flow chart illustrating a retransmission procedure in accordance with embodiments of the present invention.

The operation of the two-staged procedure including signaling of pending retransmission and recovered packets is depicted in detail in the flow chart of FIG. 5. At block 502, a peer receives RTP packets in a normal manner. At block 504, the receiving peer may determine that packets have been lost. In this regard, a packet loss may be detected if packets are not received in a particular partial stream for a predetermined length of time, as described below. If no packet loss is detected, the process returns to block 502 and continues receiving RTP packets.

If a packet loss is detected at block 504, the process proceeds to block 506 and enters the first stage of the two-stage recovery process. At block 506, it may be determined whether the receiving peer is in an active mode or not. As noted above, in this regard, a peer may wait for the stream path issues to be resolved or, alternatively, to proactively seek to resolve the issues. If the peer is not in a pro-active mode, the process proceeds to block 508 and waits for a period of time to allow the path issues to be resolved. After the period of time has elapsed, the process proceeds to block 510 and determines whether an indication of an upstream request for retransmission has been made. If such an indication has been received, the process proceeds to block 512 and waits for a length of time to allow an upstream peer to retrieve the lost packets and then proceeds to block 514. At block 514, if the lost packets are determined to have been received, the process returns to block 502 and continues or resumes receiving the stream. If the lost packets are determined to not have been received at block 514, the process returns to block 512 and waits again for the length of time.

On the other hand, if at block 510, it is determined that no upstream requests for retransmission have been made, the process proceeds to block 516. Similarly, if at block 506, it is determined that the peer is in a proactive mode, the process proceeds to block 516.

At block 516, the peer signals downstream peers an indication of lost packets using RTCP, as described above. Similarly, at block 518, the peer signals upstream peers an indication that the indication of lost packets and, therefore, a request for retransmission, has been sent. Thus, the peer-to-peer network is not flooded with requests for retransmission. The peer then waits for a period of time (block 520) and determines whether the lost packets have been received (block 522). If the packets have been received, the process returns to block 502 and continues or resumes receiving RTP packets.

On the other hand, if the determination is made at block 522 that the lost packets have not been received, a determination is made as to whether a threshold period of time has expired (block 524). If the threshold period of time has not expired, the process repeats blocks 520 and 522. If the threshold period of time has expired, the process enters the second stage of the two-stage process.

In the second stage, as described above, the peer sends requests for retransmission using RTSP (block 526). At block 528, it is determined whether an RTSP connection has been accepted. It will be understood by those skilled in the art that, while the embodiment described with reference to FIG. 5 uses RTSP for signalling, other signaling mechanisms may be used and are contemplated within the scope of the present invention.

If the connection is not accepted, the process returns to block 526 until the connection is accepted. Once the connection is accepted, the peer waits (block 530) and determines whether the lost packets have been received (block 532). Once the lost packets are received, the peer signals an indication of the recovery to upstream and downstream peers (block 534). The process then returns to block 502 and continues or resumes receiving RTP packets.

In certain embodiments, an additional scalability mechanism is provided to avoid overload of upstream retransmission requests. In this regard, the transmission of a retransmission request (or upstream packet loss signaling) is delayed by a delay that is proportional to the position of the sending peer in the data streaming path and with an additional random component. In one embodiment, the delay for sending the request may be defined as follows:

$$\text{Delay} = \frac{\text{current}_{peer_{position}}}{\text{Max}_{path_{depth}}} \times (1+\alpha) \times D_{max}$$

Where α is a random number selected between 0 and 1. The random nature of a serves to diversify delay requirements further among peers in the same level of the path. In the above equation, "current$_{peer\,position}$" is the position of the peer in the path from the original source peer. For example, in the solid-line path of FIG. 4, current$_{peer\,position}$ for peer C is 2 (A to B to C); and Max$_{path\,depth}$ is 4 (A to B to C to D to E). Further, $D_{max}$ is the maximum allowable delay for recovering a packet. This back-off mechanism may be part of the delay building block (block 508) in FIG. 5.

As noted above, in accordance with embodiments of the present invention, a two-stage process is employed to address issues related to lost packets due to an unexpectedly broken streaming path. In one embodiment, the transition from the first stage to the second stage is based on the expiration of a reconnect threshold, $T_r$. In one embodiment, the lower boundary of this threshold value may be calculated as described in the following paragraphs.

In case the lost packet is not at the end of the partial stream, there is no need to wait between packet groups of the same partial stream. The time between two packet groups belonging to the same partial stream is defined by:

partial size(in msec)*(number of partials−1).

However, if the packet is the last packet of the packet group, the normal network delay value should be added to the value above. The network delay value can be calculated from, for example, RTSP request response pairs or information sent by the other peer. Further, an additional time value should added to avoid overloading the network with retransmission requests.

Min Threshold value=[Partial size(in msec)*(Number of partials−1)]+Calculated network latencies (from RTSP messages)+[Time given to peers to patch their missing data parts]

This minimum threshold value can be used to determine when the first stage of retransmission is started (e.g., the signaling of packet losses using RTCP). This minimum threshold serves as a lower boundary for the value that is used as a threshold to transition from the first stage (e.g., RTCP) to the second stage (e.g., RTSP). Thus, the minimum threshold serves as the basis for transition from normal to first stage and as the minimum value for transition to the second stage. In this regard, a second value is used to determine the actual transition to the second stage after the minimum threshold. This second value representing the threshold for the transition from the first to the second stage ensures an additional waiting time for allowing the RTCP-based retransmission (e.g., first stage) to take effect. These values are used in case partial RTP sessions are used. In case the streaming data is partitioned in a different way (e.g., using SVC or MDC) similar considerations may apply.

In accordance with embodiments of the present invention, the RTSP PLAY message may be extended by a 'Packet-Range' header field that contains the sequence numbers of the missing packets. The format of a 'Packet-Range' header field value, in accordance with one embodiment, is shown below in an ABNF format.

Packet-Range="Packet-Range" ":"1*ranges-specifier
ranges-specifier=1*DIGIT["−"[1*DIGIT]]";"

Example messages sent in the successful retransmissions request are shown below. RTSP methods may be extended to include an additional 'RTP2P-v1' feature tag in the 'Require' header field. This feature tag makes it possible for the receiving peer to detect that support for the real-time P2P extensions is needed. Additionally, RTSP messages may include the 'Peer-Id' header field to indicate the source of the message.

PLAY rtsp://192.168.0.2:8555/87/0 RTSP/1.0
CSeq: 327750
Require: RTP2P-v1
Packet-Range: 13300-13313; 13589;
Peer-Id: 431
RTSP/1.0 200 OK
CSeq: 327750
Peer-Id: 430

In accordance with embodiments of the present invention, the message format used to signal pending retransmission requests and recovered packet losses may have several formats. Two example embodiments are described below. Each of the two embodiments includes a common packet format portion, and each embodiment includes a different report block format. The common portion format may be depicted in FIG. 9.

Different packet types (PT) should be used for pending retransmission requests, on the one hand, and recovered packet losses on the other hand. The synchronization source (SSRC) identifies the peer that has pending retransmission requests or has recovered from certain packet losses. The Feedback Message Type (FMT) values correspond to the different use cases.

In one embodiment, the correspondance between the FMT values and the use cases may be as follows:
FMT=2 (pending gap NACK);
FMT=3 (pending generic NACK);
FMT=4 (recovered gap ACK);
FMT=5 (recovered generic ACK).

Figure 10:
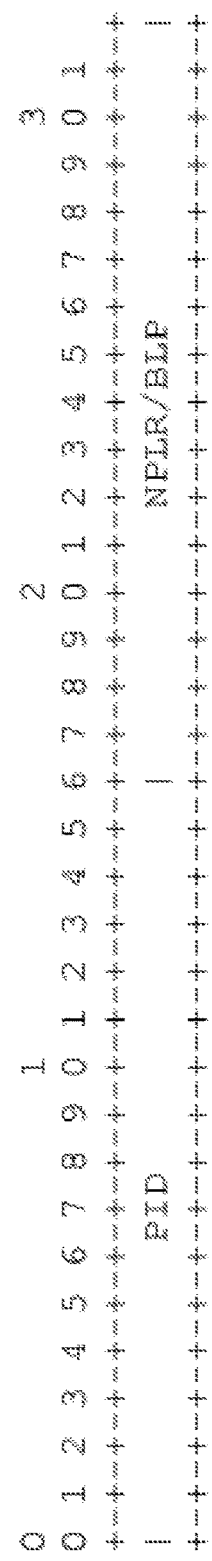

In this embodiment, the report block format may be as depicted in FIG. 10.

Similar to ACK and Generic NACK messages, "PID" resembles the sequence number of the first packet lost (or recovered). In the case of FMT=2 or FMT=4, the Number of Packet Lost or Recovered (NPLR)/Bit mask of following Lost Packets (BLP) field represents the number of packets lost or recovered from PID onwards, excluding the packet with PID itself. In the case of FMT=3 or FMT=5, this field represents a bit mask identical to the syntax and semantics of the BLP field used in the Generic NACK message specified in RFC4585.

In a second embodiment, the correspondance between the FMT values and the use cases may be as follows:
FMT=6 (pending retransmission request);
FMT=7 (recovered loss).

In this embodiment, the report block format may be as depicted in FIG. 11.

Again, "PID" resembles the sequence number of the first packet lost (or recovered). The Format (F) field indicates whether the following 15 bits represent a bit mask of following lost or recovered packets or the number of packets lost or recovered. In this regard, F=0 indicates pending gap NACK or recovered gap ACK, and F=1 indicates pending generic NACK or recovered generic ACK. In the case of F=0 the NPLR/BLP field represents the number of packets lost or recovered from PID onwards, excluding the packet with PID itself. In the case of F=1, this field represents a bit mask identical to the syntax and semantics of the BLP field used in the Generic NACK message specified in RFC4585.

A peer may aggregate this information from incoming streams and send it out to the receiving peers on the outgoing streams, particularly if the configuration of the partial streams is not constant within the service. In practice, this is the case when a particular media stream is portioned into a different number of partials on the incoming and outgoing connections of a peer.

In other embodiments, different run-length encodings may be implemented. One embodiment allows more extents consisting of the starting point and length of an error burst in a single message (in a more compressed format).

Figure 6:
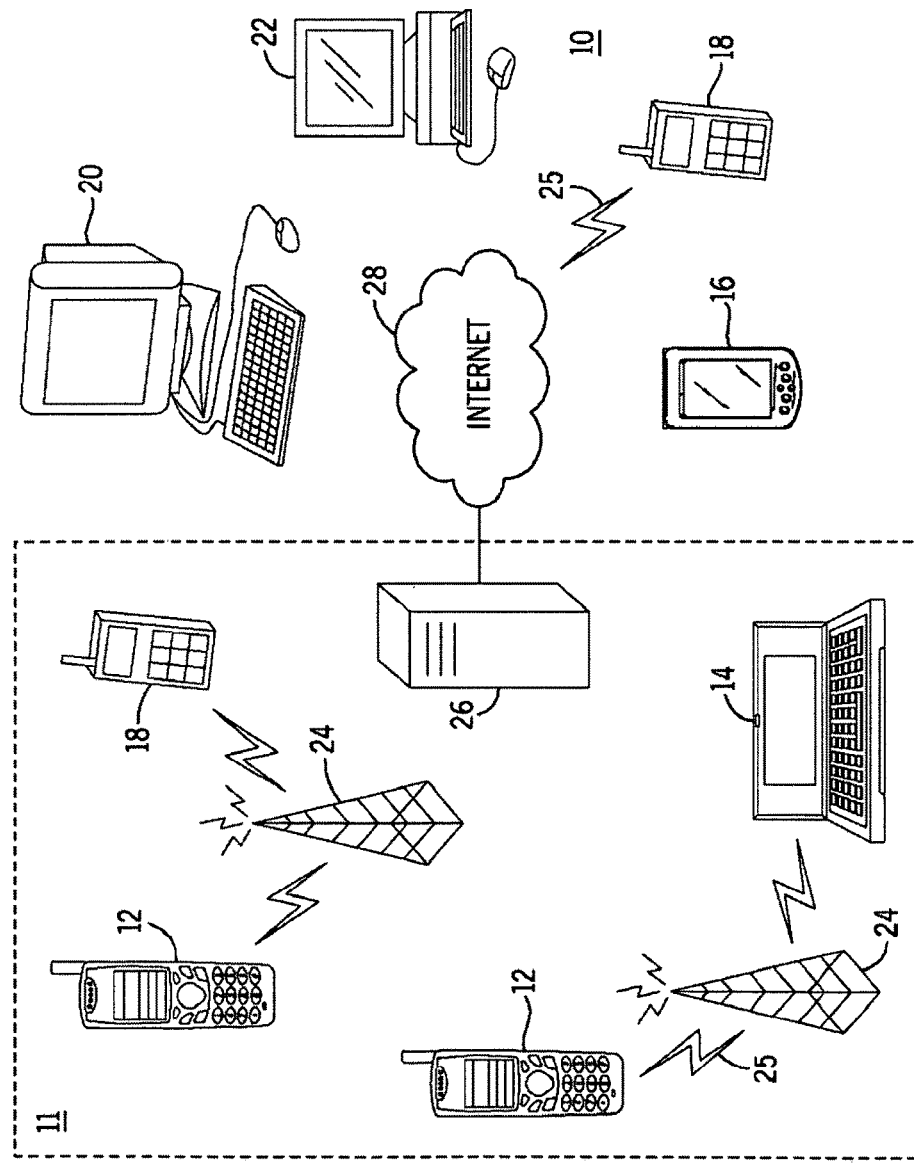
FIG. 6 is an overview diagram of a system within which various embodiments of the present invention may be implemented.

FIG. 6 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 6 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 7:
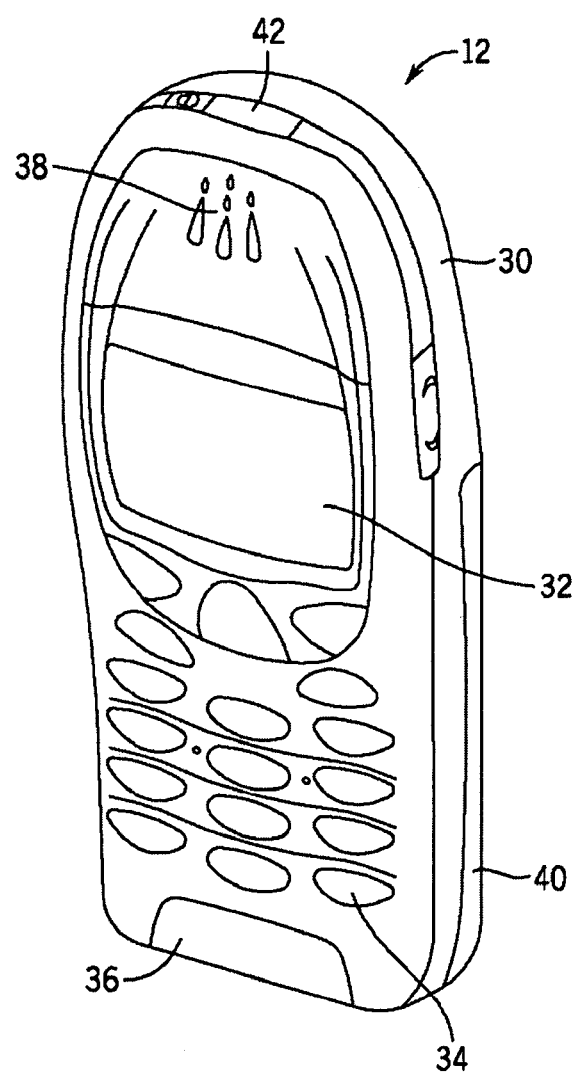
FIG. 7 illustrates a perspective view of an exemplary electronic device which may be utilized in accordance with the various embodiments of the present invention.
Figure 8:
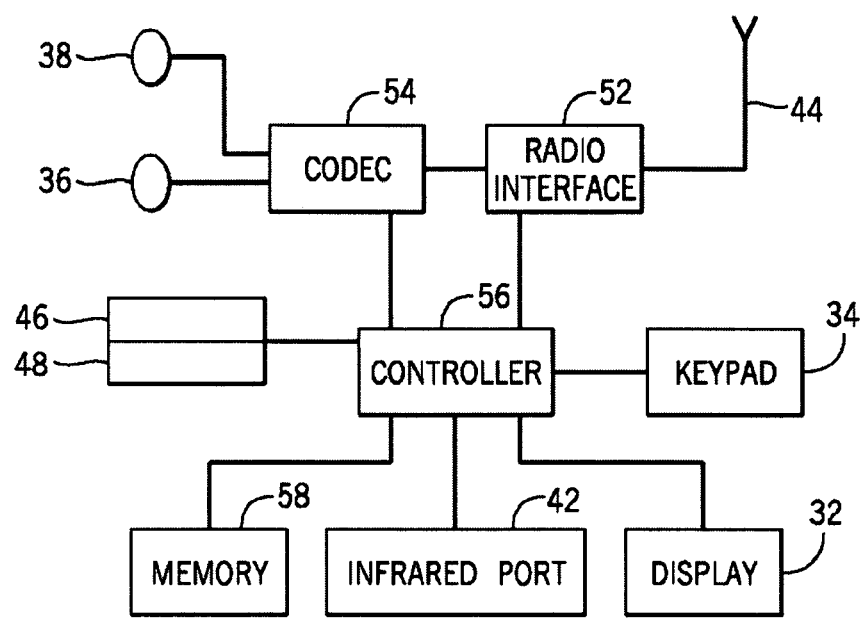
FIG. 8 is a schematic representation of the circuitry which may be included in the electronic device of FIG. 7.

FIGS. 7 and 8 show one representative electronic device 28 which may be used as a network node in accordance to the various embodiments of the present invention. It should be understood, however, that the scope of the present invention is not intended to be limited to one particular type of device. The electronic device 28 of FIGS. 7 and 8 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. The above described components enable the electronic device 28 to send/receive various messages to/from other devices that may reside on a network in accordance with the various embodiments of the present invention. Individual circuits and elements are all of a type well known in the art, for example in the Nokia range of mobile telephones.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
  detecting, by a peer, a packet loss in a partial data packet stream in a peer-to-peer network;
  signaling an indication of lost packets only to one or more sending peers serving the partial data packet stream corresponding to the packet loss;
  signaling one or more downstream peers an indication that the packet loss has been signaled to a source peer;
  after satisfaction of a threshold parameter without receiving lost packets, signaling one or more candidate peers a request for retransmission of the lost packets, the candidate peers being peers not serving the partial data packet stream, wherein the threshold parameter comprises a delay value and an additional random time value for avoiding overloading the peer-to-peer network with retransmission requests, wherein the delay value is dependent on a position of the peer in a data streaming path;
  receiving the lost packets through one of the candidate peers; and
  upon receipt of retransmitted lost packets, signaling an indication of the receipt of the lost packets to a plurality of peers including one or more peers which were upstream and one or more peers that were downstream before detection of the packet loss.

2. The method of claim 1, wherein the satisfaction of a threshold parameter is expiration of a threshold time period.

3. The method of claim 1, wherein the partial data packet stream is received through real-time transport protocol (RTP).

4. The method of claim 3, wherein the signaling in (b) uses RTP control protocol (RTCP).

5. The method of claim 3, wherein the signaling in (d) uses real time streaming protocol (RTSP).

6. The method of claim 5, wherein the signaling in (d) using real time streaming protocol (RTSP) includes setting up an RTP session with a candidate peer.

7. An apparatus, comprising:
  a processor; and
  a memory unit communicatively connected to the processor and including computer code for:
    detecting a packet loss in a partial data packet stream in a peer-to-peer network;
    signaling an indication of lost packets only to one or more sending peers serving the partial data packet stream corresponding to the packet loss;
    signaling one or more downstream peers an indication that the packet loss has been signaled to a source peer;
    after satisfaction of a threshold parameter without receiving lost packets, signaling one or more candidate peers a request for retransmission of the lost packets, the candidate peers being peers not serving the partial data packet stream, wherein the threshold parameter comprises a delay value and an additional random time value for avoiding overloading the peer-to-peer network with retransmission requests, wherein the delay value is dependent on a position of the apparatus in a data streaming path;
    receiving the lost packets through one of the candidate peers; and
    upon receipt of retransmitted lost packets, signaling an indication of the receipt of the lost packets to a plurality of peers including one or more peers which were upstream and one or more peers that were downstream before detection of the packet loss.

8. The apparatus of claim 7, wherein the satisfaction of a threshold parameter is expiration of a threshold time period.

9. The apparatus of claim 7, wherein the partial data packet stream is received through real-time transport protocol (RTP).

10. The apparatus of claim 9, wherein the signaling in (b) uses RTP control protocol (RTCP).

11. The apparatus of claim 9, wherein the signaling in (d) uses real time streaming protocol (RTSP).

12. The apparatus of claim 11, wherein the signaling in (d) using real time streaming protocol (RTSP) includes setting up an RTP session with a candidate peer.

13. A computer program product, embodied on a computer-readable medium, comprising computer code for:
    detecting, by a peer, a packet loss in a partial data packet stream in a peer-to-peer network;
    signaling an indication of lost packets only to one or more sending peers serving the partial data packet stream corresponding to the packet loss;
    signaling one or more downstream peers an indication that the packet loss has been signaled to a source peer;
    after satisfaction of a threshold parameter without receiving lost packets, signaling one or more candidate peers a request for retransmission of the lost packets, the candidate peers being peers not serving the partial data packet stream, wherein the threshold parameter comprises a delay value and an additional random time value for avoiding overloading the peer-to-peer network with retransmission requests, wherein the delay value is dependent on a position of the peer in a data streaming path;
    receiving the lost packets through one of the candidate peers; and
    upon receipt of retransmitted lost packets, signaling an indication of the receipt of the lost packets to a plurality of peers including one or more peers which were upstream and one or more peers that were downstream before detection of the packet loss.

14. The computer program product of claim 13, wherein the satisfaction of a threshold parameter is expiration of a threshold time period.

* * * * *